United States Patent
Reed

[11] 3,782,059
[45] Jan. 1, 1974

[54] GUY-WIRE GUARD FASTENERS
[75] Inventor: Robert H. Reed, Rockford, Ill.
[73] Assignee: Redmon Products Co., Sterling, Ill.
[22] Filed: July 26, 1972
[21] Appl. No.: 275,242

[52] U.S. Cl. ............................................... 52/147
[51] Int. Cl. ........................................... E04h 12/20
[58] Field of Search ...................... 52/147, 726, 122

[56] References Cited
UNITED STATES PATENTS

| | | | |
|---|---|---|---|
| 1,988,667 | 1/1935 | Smalley | 52/147 |
| 3,245,190 | 4/1966 | Reiland | 52/726 |
| 3,404,501 | 10/1968 | Von Wedel | 52/122 X |
| 2,604,178 | 7/1952 | Steinmayer | 52/147 |
| 1,183,161 | 5/1916 | Bierce | 52/147 |
| 1,916,382 | 7/1933 | McIlrath | 52/147 |
| 2,511,012 | 6/1950 | Runde et al. | 52/147 |

Primary Examiner—Price C. Faw, Jr.
Attorney—Andrew F. Wintercorn

[57] ABSTRACT

The guy-wire guard fasteners of both forms involve the wedging action of a semi-conical shaped portion of a wedge plate against one side of the guy-wire by driving the wedge plate endwise in one direction while the parallel lateral edge portions of the wedge plate that are in a plane oppositely inclined relative to the semi-conical portion of the plate slide in grooves provided therefor in the two legs of an inverted U-shaped fastener bolt or element, these legs extending through holes in the middle portion of the guard on opposite sides of the guy-wire so that the guy-wire is clamped firmly against the inside of the guard by the wedge plate.

In the other form of fastener in which downwardly bent tapered flanges define the parallel side edge portions of the wedge plate and these flanges are slit vertically at regularly spaced intervals so that lugs can be bent outwardly from the flanges on opposite sides of the legs of the U-shaped fastener element in which grooves are defined for sliding engagement of the flanges in the endwise movement of the wedge plate to wedged position, the outwardly bent lugs positively lock the wedge plate against endwise movement from wedged position. This prevents loosening of the wedge plate in the event of any endwise movement of the guard relative to the guy-wire.

15 Claims, 8 Drawing Figures

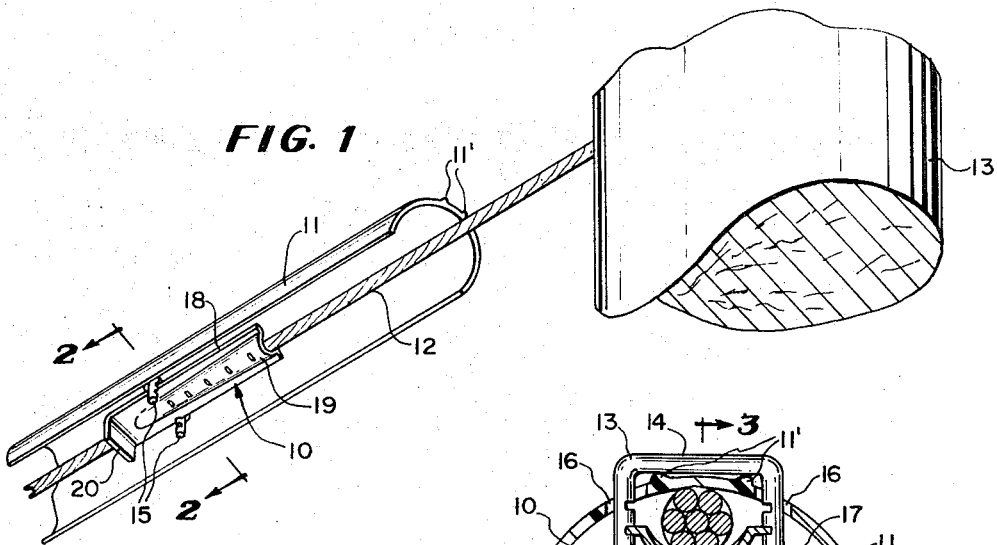
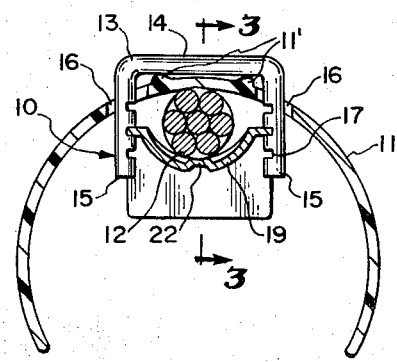
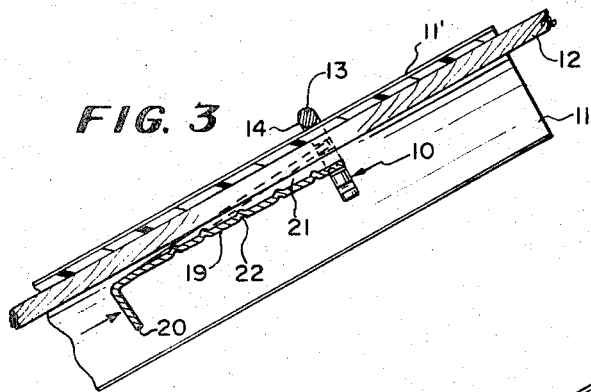
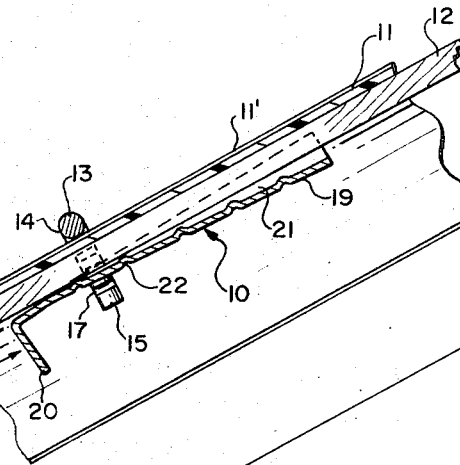
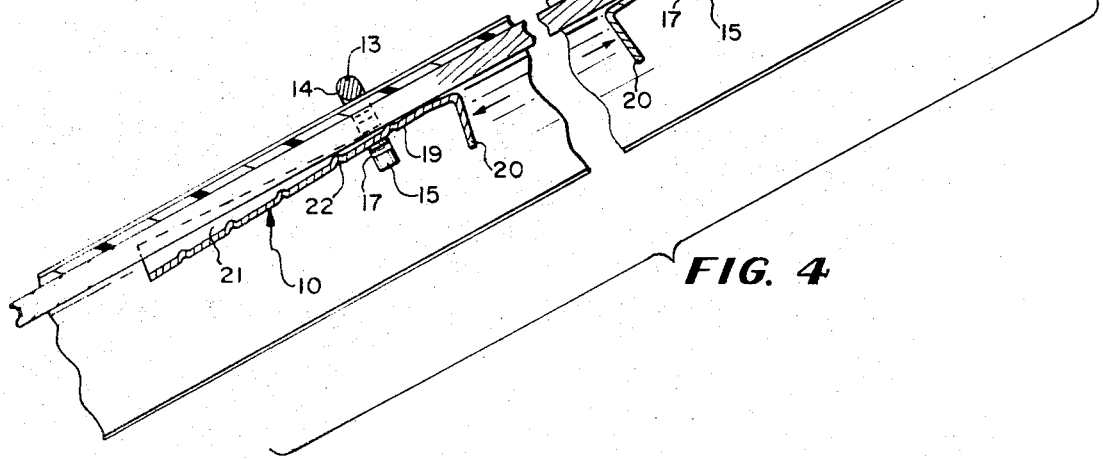

GUY-WIRE GUARD FASTENERS

This invention relates to guy-wire guard fasteners, the guards, which are of elongated channel shape or three quarter hollow molded plastic construction and used primarily for safety and improved visibility, have heretofore been secured to the guy-wires by various means, some makeshift and others mostly too complicated and expensive in addition to being time-consuming in their application in relation to the simplicity of the function served. A further objection is that the prior fasteners usually required different sizes for different sizes of guy-wires, which vary from one-quarter inch diameter to five-eighths inch diameter, thus necessitating keeping on hand a considerable stock of fasteners for all of the different sizes of guy-wires.

It is, therefore, the principal object of my invention to provide fasteners one size of which is adapted to fit the full range of guy-wire sizes and be applicable quickly and easily to any size of guy-wire by simply entering the opposed longitudinal edge portions of the stamped sheet metal tapered wedge plate into the proper notches provided in vertically spaced relation on the inner side of the legs of the U-shaped fastener bolt that straddles the guy-wire while clamping the mid-portion of the guard to the guy-wire on the diametrically opposite side of the wire from the slidable tapered wedge plate.

Another improved fastener utilizes a tapered wedge plate also, but in that form the U-shaped member is of stamped sheet metal construction like the wedge plate, and a novel locking feature is incorporated consisting in slitting the side flanges of the wedge plate in uniformly spaced relationship so that portions of the flanges on the wedge plate on opposite sides of the legs of the U-shaped member can be bent outwardly to serve as locking lugs on opposite sides of the legs of the U-shaped member to positively secure the wedge plate in a tight holding position after it has been driven home as far as it can go in the wedging direction thus securely locking the wedge plate and clamping the guy-wire to the plastic guard, so that there is no need for the precaution necessary with the other form of fasteners of being sure to drive the two wedge plates of a pair on a guard in opposite directions to prevent them from loosening if the guard slides a little on the wire.

The invention is illustrated in the accompanying drawings, in which:

FIG. 1 is a perspective view of a guy-wire guard in use, showing one of my improved fasteners;

FIG. 2 is a cross-section on the line 2—2 of FIG. 1;

FIG. 3 is a longitudinal-section on the line 3—3 of FIG. 2 on the same scale approximately as FIG. 1, showing the wedge plate at the start of the assembling operation before the wedge plate has been driven home to clamp the guard to the guy-wire;

FIG. 4 is another longitudinal-section like FIG. 3, but showing two fasteners spaced lengthwise of the guard with the wedge plates thereof driven from in opposite directions, an intermediate portion of the guard and guy-wire being broken away to conserve space in the drawing and enable showing the two fasteners on a larger scale than would otherwise be possible;

Similar reference numerals are applied to corresponding parts throughout the views.

Figure 5:
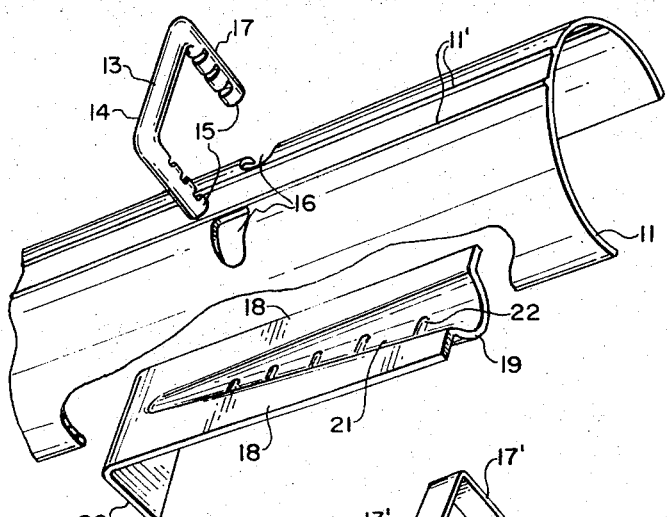
FIG. 5 is an exploded perspective view showing the components of one of the fasteners of FIGS. 1 to 4 prior to assembly on the guard and guy-wire.

Referring first to FIGS. 1 to 4, the reference numeral 10 designates a fastener assembly as a whole made in accordance with my invention used in conjunction with a typical guard 11, the guy-wire 12 extending at the usual angle of inclination between an anchor bolt (not shown) in a utility pole 15 and another anchor bolt (not shown) set in the ground at some distance from the pole in the usual way.

As previously indicated, the guy-wires 12 used range in size from one-quarter inch to five-eighths inch diameter, according to the load requirements, but the guards 11 can be of a standard size, about 2½ inches in diameter, with the open side about 2 inches in width. The guard shown herein is of molded plastic material but the particular material used is not so important as the new fasteners employed.

Referring to FIGS. 1 to 5, each fastener assembly 10 consists of a U-shaped fastener bolt 13, the cross-portion 14 of which straddles the center line of the guard 11 on the outer side, the two legs 15 of the bolt extending through holes 16 provided on the guard 11 spaced evenly on opposite sides of the center line of the guard, so that these two legs are spaced evenly on both sides of the guy-wire 12, as best appears in FIG. 2, for the same good access to the vertically spaced notches 17 that are provided in evenly spaced relation on the inner side of the two legs 15 and there is no problem of entering the parallel lateral straight edge portions 18 of the stamped sheet metal wedge plate 19 in the proper pair of opposed coplanar notches before the wedge plate is driven endwise to its anchoring position, it being first forced by thumb pressure against the downwardly bent transverse end 20. Good wedging action is thereafter obtained by driving the plate endwise as far as it will go resulting from the acute angulation one way of the semi-conical recess 21 relative to the plane of the wedge plate and defined longitudinally of the wedge plate mid-way between the coplanar parallel side edge portions 18 that are in a plane of opposite inclination relative to the semi-conical recess 21. The transversely extending ribs 22 defined in the trough of the recess 21 in longitudinally spaced relationship give good frictional gripping action when the wedge plate is driven home, as by a blow from a hammer on the bent end 20, so that there is no likelihood of the wedge plate getting loose and being removed by some unauthorized person, thus leaving the guard 11 unfastened so that it might also be removed, thereby subjecting the utility owning the guy-wire and its guard to legal action for injury sustained by reason of the guy-wire being left unguarded. It is obvious that with the semi-conical recess 21 of appreciable depth at the open end, as best seen in FIG. 5, one and the same size of wedge plate can be used on various sizes of guy-wires so that there is no need of keeping in stock various sizes of fasteners. The arrows in FIGS. 3 and 4 indicate the directions of assembling the wedge plates on the bolts 13, FIG. 4 illustrating how two fasteners are assembled with the wedge plates driven in opposite directions so as to prevent their loosening if the guard 11 slides relative to the wire 12. The longitudinally extending parallel ribs 11' molded integral with the guard 11 on opposite sides of the center line, as best appears in FIG. 2, serve to keep the guard 11 from rocking on the guy-wire 12 as in axis, thereby lessening greatly any likelihood of the fasteners loosening by reason of man-handling of the guard, as can and will happen occasionally. In other words, the cross-portion 14 of the U-bolt 13 bears evenly on the guard 11 at its center line and on the ribs 11' on opposite sides of the center line of the guard, as clearly shown in FIG. 2.

Figure 6:
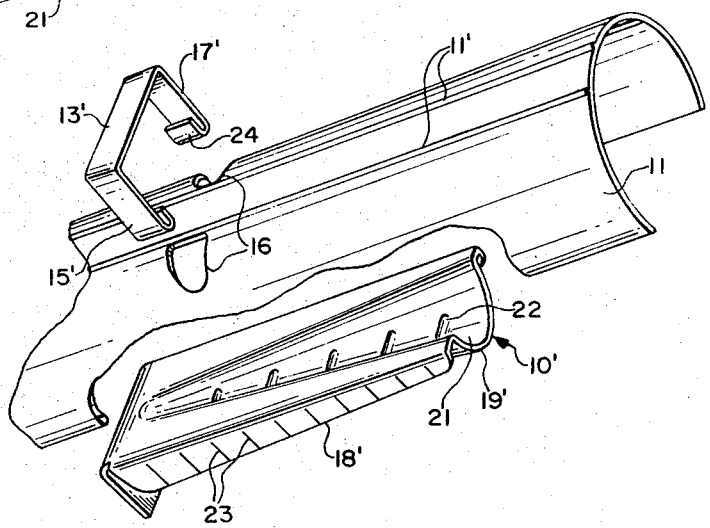
FIG. 6 is a view similar to FIG. 5, showing the components of a modified form of fastener using a different from of stamped sheet metal wedge plate in combination with a U-shaped fastener member of stamped sheet metal construction.
Figure 7:
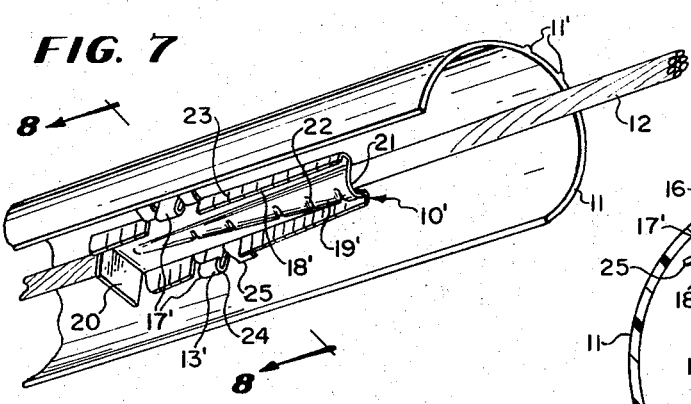
FIG. 7 is a view similar to FIG. 1, but showing the fastener of FIG. 6 installed and locked in place.
Figure 8:
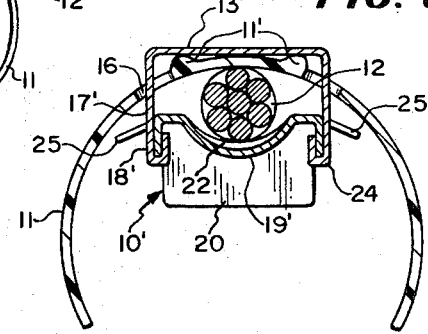
FIG. 8 is a cross-section on the line 8—8 of FIG. 7 on the same scale as FIG. 2, serving better to illustrate the mode of locking.

The fastener indicated generally by the reference numeral 10' in FIGS. 6 to 8 is closely similar to the fastener 10 shown in FIGS. 1 to 5, the difference being that the straight edge portions 18' of the wedge plate 19' are flanged downwardly and are slit, as indicated at 23, in uniformly spaced parallel relation in approximately the same spaced relationship as the width of the legs 15' of the stamped sheet metal U-shaped fastener 13', the legs 17' of which have on their ends inwardly bent U-shaped jaws 24, thus permitting the anchoring of the wedge plate 19' in its holding position by bending outwardly lugs 25 against moving in either direction by reason of the contact of the lugs 25 with opposite sides of the legs 17' of the U-shaped fastener 13', as seen in FIGS. 7 and 8. Otherwise, this construction is the same as that shown in FIGS. 1 to 5. The semi-conical recess 21 in this form is the same as in the other form previously described and has the same transversely extending holding ribs 22 in longitudinally spaced relation for the same purpose previously mentioned.

In operation, both forms involve the driving of the wedge plate 19 or 19' endwise to its fully wedged position, clamping the guy-wire 12 between it and the guard 11, the only difference being that in the first form indicated generally by the reference numeral 10, wherein there is no separate means for fixing the wedge plate 19 against endwise movement in the event of any endwise movement of the guard 11 after the fasteners 10 have been assembled and the wedge plates 19 have been driven home, it is advisable to apply one of a pair of wedge plates 19 in one direction and the other of the pair in the opposite direction as shown in FIG. 4, to reduce likelihood of the guard 11 becoming unfastened. Of course, there is no reason to expect the guard 11 to be given any endwise movement, but it is only to insure against such an eventuality that it is preferred to have the fasteners 10 of a pair assembled in opposite directions as described.

With the other construction shown in FIGS. 6 to 8, the positive locking action obtainable by outward bending of lugs 26 on opposite sides of either or both legs of the fastener 13', any endwise movement of the guard 11 relative to the guy-wire 12 can have no effect on the tight hold of the fastener 10' when driven home properly clamping the guy-wire 12 to the inside of the guard 11, as shown in FIGS. 7 and 8, because the lugs 25 prevent endwise movement of the wedge plate 19' relative to the fastener element 13'.

The flanges 23 are of diminishing width from the shallow end of the semi-conical shaped portion 21 toward the other end, as best appears in FIGS. 6 and 7. This, however, does not interfere with there being lugs 25 of ample length for the locking action described.

It is believed the foregoing description conveys a good understanding of the objects and advantages of my invention. While a preferred embodiment of the invention has been illustrated and described, this is only for the purpose of illustration, and it is to be understood that various modifications in structure will occur to a person skilled in this art.

I claim:

1. A guy-wire guard comprising an elongated generally channel-shaped body in which the guy-wire is received, the body having a pair of laterally spaced holes provided therein on opposite sides of its longitudinal center line, a U-shaped clamping element, the two legs of which extend through the holes and are disposed on opposite sides of the guy-wire, while its cross-portion has clamping engagement with that portion of the body between the two holes, and an elongated wedge-shaped plate extending longitudinally of the guy-wire to clamp the same between it and the inner side of said body by wedging engagement with said guy-wire, said wedge plate having parallel side edge portions slidably and wedgingly engaging on shoulders provided therefor on the inner sides of the two legs of the U-shaped clamping element.

2. The structure as set forth in claim 1 including means for positively locking the wedge plate against endwise movement from its wedged position.

3. The structure as set forth in claim 1 wherein the wedge plate is of stamped sheet metal construction and the wedging face thereof is defined by a generally semi-conical shaped portion which defines a recess lengthwise of the plate in the bottom of which the guy-wire is disposed at an acute angle relative to the oppositely inclined plane of the opposite side edge portions of said wedge plate.

4. The structure as set forth in claim 1 wherein the wedge plate is of stamped sheet metal construction and the wedging face thereof is defined by a generally semi-conical shaped portion which defines a recess lengthwise of the plate in the bottom of which the guy-wire is disposed at an acute angle relative to the oppositely inclined plane of the opposite side edge portions of said wedge plate, there being ribs defined in said semi-conical recessed portion of the plate transversely of the bottom thereof in longitudinally spaced relation relative to said wedge plate to afford increased frictional engagement with the guy-wire in the wedged position of the plate.

5. The structure as set forth in claim 1 wherein the wedging face of the wedge plate is defined by a generally semi-conical shaped portion which defines a recess lengthwise of the plate in the bottom of which the guy-wire is disposed at an acute angle relative to the oppositely inclined plane of the opposite side edge portions of the said wedge plate.

6. The structure as set forth in claim 1 wherein the wedge plate is of stamped sheet metal construction and the wedging face thereof is defined by a generally semi-conical shaped portion which defines a recess lengthwise of the plate in the bottom of which the guy-wire is disposed at an acute angle relative to the oppositely inclined plane of the opposite side edge portions of said wedge plate, the side edge portions of the plate being defined by downwardly bent flanges, which are slidable at their lower edge portions in guides defined on the end portions of the legs of the U-shaped clamping element, these flanges being tapered lengthwise so that the narrow ends are adjacent the deep end of the semi-conical shaped portion of the wedge plate and the wide ends are adjacent the shallow end of the semi-conical shaped portion.

7. The structure as set forth in claim 1 wherein the wedge plate is of stamped sheet metal construction and the wedging face thereof is defined by a generally semi-conical shaped portion which defines a recess lengthwise of the plate in the bottom of which the guy-wire is disposed at an acute angle relative to the oppositely inclined plane of the opposite side edge portions of said wedge plate, there being ribs defined in said semi-conical recessed portion of the plate transversely of the bottom thereof in longitudinally spaced relation relative to said wedge plate to afford increased frictional engagement with the guy-wire in the wedged position of the plate, the side edge portions of the plate being defined by downwardly bent flanges, which are slidable at their lower edge portions in guides defined on the end portions of the legs of the U-shaped clamping element, these flanges being tapered lengthwise so that the narrow ends are adjacent the deep end of the semi-conical shaped portion of the wedge plate and the wide ends are adjacent the shallow end of the semi-conical shaped portion.

8. The structure as set forth in claim 1 wherein the wedge is of stamped sheet metal construction and the wedging face thereof is defined by a generally semi-conical shaped portion which defines a recess lengthwise of the plate in the bottom of which the guy-wire is disposed at an acute angle relative to the oppositely inclined plane of the opposite side edge portions of said wedge plate, there being ribs defined in said semi-conical recessed portion of the plate transversely of the bottom thereof in longitudinally spaced relation relative to said wedge plate to afford increased frictional engagement with the guy-wire in the wedged position of the plate, the side edge portion of the plate being defined by downwardly bent flanges, which are slidable at their lower edge portions in guides defined on the end portions of the legs of the U-shaped clamping element, these flanges being tapered lengthwise so that the narrow ends are adjacent the deep end of the semi-conical shaped portion of the wedge plate and the wide ends are adjacent the shallow end of the semi-conical shaped portion, portions of said flanges being bendable outwardly for abutment alongside at least one of the legs of said U-shaped fastener element to lock the wedge plate against endwise movement from wedged position.

9. The structure as set forth in claim 1 wherein the wedge plate is of stamped sheet metal construction and the wedging face thereof is defined by a generally semi-conical shaped portion which defines a recess lengthwise of the plate in the bottom of which the guy-wire is disposed at an acute angle relative to the oppositely inclined plane of the opposite side edge portions of said wedge plate, there being ribs defined in said semi-conical recessed portion of the plate transversely of the bottom thereof in longitudinally spaced relation relative to said wedge plate to afford increased frictional engagement with the guy-wire in the wedged position of the plate, the side edge portion of the plate being defined by downwardly bent flanges, which are slidable at their lower edge portions in guides defined on the end portions of the legs of the U-shaped clamping element, these flanges being tapered lengthwise so that the narrow ends are adjacent the deep end of the semi-conical shaped portion of the wedge plate and the wide ends are adjacent the shallow end of the semi-conical shaped portion, portions of said flanges being bendable outwardly for abutment alongside at least one of the legs of said U-shaped fastener element to lock the wedge plate against endwise movement from wedged position, the flanges being slit at spaced intervals to define the bendable lugs.

10. The structure as set forth in claim 1 wherein the wedge plate is of stamped sheet metal construction and the wedging face thereof is defined by a generally semi-conical shaped portion which defines a recess lengthwise of the plate in the bottom of which the guy-wire is disposed at an acute angle relative to the oppositely inclined plane of the opposite side edge portions of said wedge plate, there being ribs defined in said semi-conical recessed portion of the plate transversely of the bottom thereof in longitudinally spaced relation relative to said wedge plate to afford increased frictional engagement with the guy-wire in the wedged position of the plate, the side edge portion of the plate being defined by downwardly bent flanges, which are slidable at their lower edge portions in guides defined on the end portions of the legs of the U-shaped clamping element, these flanges being tapered lengthwise so that the narrow ends are adjacent the deep end of the semi-conical shaped portion of the wedge plate and the wide ends are adjacent the shallow end of the semi-conical shaped portion, portions of said flanges being bendable outwardly for abutment alongside at least one of the legs of said U-shaped fastener element to lock the wedge plate against endwise movement from wedged position, the flanges being slit at spaced intervals to define the bendable lugs, the spacing of the slits being approximately the same as the width of the legs of the U-shaped fastener element.

11. The structure as set forth in claim 1 wherein the wedge plate is of stamped sheet metal construction and the wedging face thereof is defined by a generally semi-conical shaped portion which defines a recess lengthwise of the plate in the bottom of which the guy-wire is disposed at an acute angle relative to the oppositely inclined plane of the opposite side edge portions of said wedge plate, the U-shaped clamping element being also of stamped sheet metal construction and the two legs of the U having on the outer ends thereof inwardly and upwardly bent U-shaped guide portions in which downwardly bent flanges on the side edge portions of the wedge plate are slidably supported for lengthwise movement of the wedge plate to wedged position relative to the guy-wire.

12. The structure as set forth in claim 1 wherein the wedge plate is of stamped sheet metal construction and the wedging face thereof is defined by a generally semi-conical shaped portion which defines a recess lengthwise of the plate in the bottom of which the guy-wire is disposed at an acute angle relative to the oppositely inclined plane of the opposite side edge portions of said wedge plate, there being ribs defined in said semi-conical recessed portion of the plate transversely of the bottom thereof in longitudinally spaced relation relative to said wedge plate to afford increased frictional engagement with the guy-wire in the wedged position of the plate, the U-shaped clamping element being also of stamped sheet metal construction and the two legs of the U having on the outer ends thereof inwardly and upwardly bent U-shaped guide portions in which downwardly bent flanges on the side edge portions of the wedge plate are slidably supported for lengthwise movement of the wedge plate to wedged position relative to the guy-wire.

13. The structure as set forth in claim 1 wherein the slope of the side edges of said wedge plate is in the opposite direction from that of the wedging face of the wedge plate.

14. The structure as set forth in claim 1 wherein the slope of the side edges of said wedge plate is in the opposite direction from that of the wedging face of the wedge plate, the wedging face of the wedge plate being defined by a semi-conical depression longitudinally of the plate, while the sloping side edges are defined by downwardly projecting flanges that are widest at the shallow end of the depression and narrowest at the other end thereof.

15. The structure as set forth in claim 1 wherein the slope of the side edges of said wedge plate is in the opposite direction from that of the wedging face of the wedge plate, the wedging face of the wedge plate being defined by a semi-conical depression longitudinally of the plate, while the sloping side edges are defined by downwardly projecting flanges that are widest at the shallow end of the depression and narrowest at the other end thereof, the flanges having portions adapted to be bent out of the planes thereof to serve as shoulders limiting endwise movement of said wedge plate relative to said clamping element.

* * * * *